UNITED STATES PATENT OFFICE 2,376,443

GLUCOSIDES AND PROCESS OF MAKING THE SAME

Karl Miescher, Riehen, and Jules Heer, Basel, Switzerland, and Werner Fischer, Summit, N. J., assignors to Ciba Pharmaceutical Products Inc., Summit, N. J., a corporation of New Jersey No Drawing. Original application March 25, 1941, Serial No. 385,196. Divided and this application April 28, 1943, Serial No. 484,924

14 Claims. (Cl. 260—210)

This invention relates to the manufacture of new sugar derivatives of non-steroids having the effect of steroid hormones by treating such non-steroids with an etherifying sugar derivative in the presence of a catalyst useful in furthering etherification.

As parent material there may be used any non-steroid, having the effect of steroid hormones, which contains at least one reactive hydroxyl group. The following compounds may be especially named as examples: alkyl- or alkenyl-polyphenols such as 4:4'-dihydroxy-$\alpha$:$\beta$-diethyl-diphenylethane, 4:4'-$\alpha$:$\beta$-tetrahydroxy-$\alpha$:$\beta$-diethyldiphenylethane, dianols, hydroxy-compounds of the stilbene series such as 4:4'-dihydroxystilbene, $\alpha$:$\alpha'$-dialkyl-, -dialkenyl-, -dialkinyl-, -alkyl-aryl- or -diaryl-4:4'-dihydroxystilbenes such as $\alpha$:$\alpha'$-dimethyl-4:4'-dihydroxystilbene, $\alpha$:$\alpha'$-diethyl-4:4'-dihydroxystilbene, $\alpha$-methyl-$\alpha'$-ethyl-4:4'-dihydroxystilbene, $\alpha$:$\alpha'$-diisopropyl-4:4'-dihydroxystilbene, $\alpha$:$\alpha'$-diethinyl-4:4'-dihydroxystilbene or $\alpha$:$\alpha'$-diphenyl-4:4'-dihydroxystilbene, further $\alpha$-mono-alkyl-, -alkenyl-, -alkinyl- or -aryl-4:4'-dihydroxystilbenes such as methyl-, ethyl-, ethenyl-, ethinyl-, allyl- or phenyl-4:4'-dihydroxystilbenes. Further also hydroxy-compounds of the polyphenylethane series which are substituted in $\alpha$- and/or $\alpha'$-position by alkenyl, alkinyl or alkylidenes, such as for example 3:4-(4':4''-dihydroxy-diphenyl)-2:4-hexadiene, 2:3-(4':4''-dihydroxydiphenyl)-1:3-butadiene, $\alpha$:$\alpha'$-diethinyl-4':4''-dihydroxy-diphenylethane, $\alpha$:$\alpha'$-diallyl-2':2''-dihydroxydiphenylethane, $\alpha$-ethinyl-4':4''-dihydroxy-diphenylethane, ethylidene-4':4'':4'''-trihydroxy-triphenylethane.

Etherifying sugar derivatives include such sugar derivatives as are capable of etherifying compounds containing hydroxyl groups. Particular mention is made of the acyl compounds and the acyloxy-halogen compounds of the saccharides, such as for example acetyl glucose, pentacetyl glucose and acetobromo glucose. As saccharides there may be used for instance mono-, di- or tri-saccharides, such as glucosides, galactosides, or galactose-glucosides. The process of the invention may be carried out by known methods in presence of a catalyst useful in furthering etherification, such as are described for example in Richter-Anschütz, Chemie der Kohlenstoffverbindungen, vol. 2, 1st half, page 359 (1935). This text-book describes for example the action of hydrochloric acid on alcoholic sugar solutions, the reaction of alcohols with 1:2-oxides of sugars and the manufacture of phenolglycosides from phenols and sugar acetates by zinc chloride or para-toluene sulfonic acid. But other known catalysts furthering the etherification may also be used, for example silver oxide, silver carbonate, mercury salts such as mercury oxide, mercury acetate (cf. Berichte, vol. 62, page 990/1929) and mercury succinate, emulsin and the glucosidase of yeast.

The new compounds may contain one or more saccharide residues in the molecule and also hydroxyl groups which are still free or have been esterified or etherified. The saccharide residue may also be present in the form of derivatives, for instance in the form of their acylates.

The new compounds are characterised by their better solubility in water and are useful in therapeutics.

The following examples illustrate the invention:

Example 1

1 part by weight of 4:4'-dihydroxy-$\alpha$:$\beta$-diethylstilbene, 3 parts of penta-acetylglucose and 0.1 part of paratoluenesulfonic acid and 10 parts of benzene are boiled for five hours. The solution is then taken up in benzene and washed with dilute caustic soda lye and water and then dried over sodium sulfate. After evaporating the benzene finally in a vacuum there is obtained the octa-acetyl-bis-glucoside of dihydroxydiethylstilbene in the form of colorless crystals. F. 227-230°. It may be recrystallised from methanol or ethanol.

The acetyl derivative may be saponified by heating a methanol solution thereof with 1 part of a solution of 1 part of sodium in 100 parts of methanol for a short time. Water is then added, whereby 4:4'-bis-($\beta$-glucoside)-$\alpha$:$\beta$-diethylstilbene is precipitated in the form of a white powder. It may be recrystallised from butanol and melts with decomposition at about 245°. The saponification may also be effected with other hydrolising agents, for example sodium hydroxide.

In analogous manner there may be obtained the polysaccharides of for instance 4:4'-bis-($\beta$-lactoside)- or 4:4'-bis($\beta$-gentiobiosido)-d-glucoside or the same parent material.

The said saccharides can equally well be obtained by way of other etherifying sugar derivatives, such as the corresponding acetohalogen sugars or acetyl sugars even in presence of other catalysts furthering etherification, for instance zinc chloride, silver carbonate, mercury salts such as mercury acetate, mercury oxide and mercury succinate, emulsin or the glucosidase of yeast.

In quite similar manner the sugar derivatives of polyanols, for instance dianol, alkyl-mono- and poly-phenols, such as 4:4'-dihydroxy-α:β-diethyl-diphenylethane, 4:4'-α:β-tetrahydroxy-α:β-diethyl-diphenylethane, hydroxy-compounds of the polyphenylethane series which are substituted in α- and/or α'-position by alkenyl, alkinyl or alkylides, such as for example α:α'-diethinyl-4':4''-dihydroxy-diphenylethane, α-ethenyl-2'-hydroxydiphenylethane, α-ethylidene-4:4':4''-trihydroxy-triphenylethane, may be obtained.

*Example 2*

4.4 parts by weight of 4:4'-dihydroxy-α:β-diethyl-diphenylethane, 3.6 parts by weight of benzoic acid anhydride and 50 parts by volume of dry pyridine are boiled for 2 hours in a reflux apparatus. The pyridine is distilled in vacuo and the residue taken up in ether whereby the dibenzoate of the 4:4'-dihydroxy-α:β-diethyl-diphenylethane which is sparingly soluble in ether is separated nearly quantitatively. The dibenzoate is suction-filtered and washed with ether. The ether solution is washed first with dilute sulfuric acid, then with sodium carbonate solution and finally with water. After drying it is evaporated and the oily residue is taken up in aqueous methanol. After standing for some time the monobenzoate of the 4:4'-dihydroxy-α:β-diethyl-diphenylethane crystallises, which after recrystallisation from methanol melts at 123-126° C.

5 parts of freshly precipitated and dried silver oxide are introduced while stirring into a solution consisting of 2.4 parts of 4-hydroxy-4'-benzoxy-α:β-diethyl-diphenylethane and 7.2 parts of aceto-bromoglucose in 50 parts by volume of dry quinoline. After stirring for a long time the reaction product is taken up in 200 parts of chloroform. The chloroform solution is filtered through an aluminium oxide filter in order to remove the silver oxide and the silver bromide, then washed with dilute sulfuric acid, dilute sodium carbonate solution and water and after drying evaporated in a vacuum. The monotetracetyl-β-glucoside of the 4-hydroxy-4'-benzoxy-α:β-diethyl-diphenylethane after chromatographic purification and recrystallization, melts at 156° C.

1.9 parts of this compound are suspended in 60 parts of methanol and the solution is stirred at room temperature with a solution of 0.3 part of sodium in 30 parts of methanol. After some hours a clear solution is obtained which is exactly neutralised with dilute acetic acid and then evaporated to a small volume. By adding water the mono-β-glucoside of the 4:4'-dihydroxy-α:β-diethyl-diphenylethane, which melts at 203-204° C. when recrystallised from aqueous methanol, is obtained.

The same product can be obtained in analogous manner by way of the mono-acetate or mono-propionate of the 4:4'-dihydroxy-α:β-diethyl-diphenylethane instead of with the mono-benzoate, the corresponding mono-tetracyl-β-glucoside of the 4-hydroxy-4'-acyloxy-α:β-diethyl-diphenylethanes being thereby formed as intermediate products. The glucose radical can of course be esterified also with other acids than acetic acid, for example with propionic acid. Instead of glucose there may be introduced the radicals of other monosaccharides, like mannose, arabinose etc. using an etherifying derivative of them and a catalyst useful in furthering etherification.

This application is a division of our application Serial No. 385,196, filed March 25, 1941, which is itself a continuation in part of our application Serial No. 257,736, filed February 21, 1939 (now U. S. Patent No. 2,270,380).

What we claim is:

1. A process for the manufacture of glucosides which comprises reacting a compound of the formula:

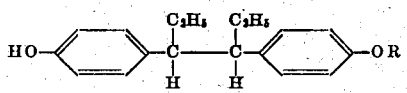

wherein R is a member of the group consisting of hydrogen, lower aliphatic acyl and aroyl, with an etherifying monosaccharide derivative selected from the group consisting of the lower aliphatic acyl and acyloxy-halogen compounds of the monosaccharides and mixed with a catalyst useful in furthering etherification.

2. A process as defined in claim 1, and comprising the further step of treating the resultant product with a hydrolyzing agent.

3. A process for the manufacture of glucosides which comprises reacting a compound of the formula:

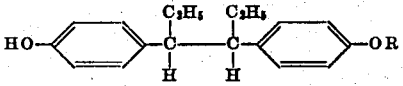

wherein R is a member of the group consisting of hydrogen, lower aliphatic acyl and aroyl, with an etherifying glucose derivative selected from the group consisting of the lower aliphatic acyl and acyloxy-halogen compounds of glucose and mixed with a catalyst useful in furthering etherification.

4. A process as defined in claim 3, and comprising the further step of treating the resultant product with a hydrolyzing agent.

5. A process for the manufacture of glucosides, which comprises reacting a compound of the formula:

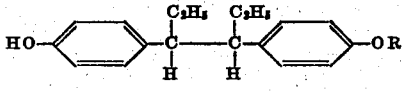

wherein R is a member of the group consisting of hydrogen, lower aliphatic acyl and aroyl, with pentaacetyl glucose mixed with paratoluenesulfonic acid.

6. A process for the manufacture of glucosides which comprises reacting a compound of the formula:

wherein R is a member of the group consisting of hydrogen, lower aliphatic acyl and aroyl, with pentaacetyl glucose mixed with paratoluenesulfonic acid and then treating the product thus obtained with hydrolyzing agent.

7. A process for the manufacture of glucosides, which comprises reacting a compound of the formula:

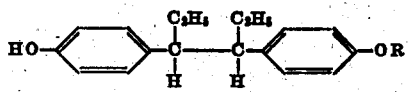

wherein R is a member of the group consisting of hydrogen, lower aliphatic acyl and aroyl, with pentaacetyl glucose mixed with paratoluenesulfonic acid and then treating the product thus obtained with sodium ethylate.

8. The compounds of the formula:

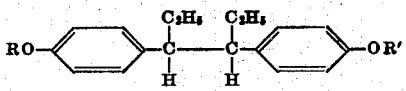

wherein R is a member of the group consisting of a free and a lower aliphatic acylated monosaccharide radical, and R' is a member of the group consisting of hydrogen, lower aliphatic acyl, lower aroyl, and free and lower aliphatic acylated monosaccharide radicals.

9. The compounds of the formula:

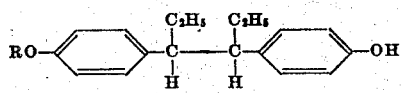

wherein R is a member of the group consisting of a free and a lower aliphatic acylated glucose radical.

10. The compounds of the formula:

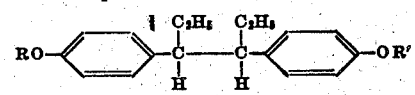

wherein R is a lower aliphatic acylated glucose radical and R' is a lower aliphatic acyl radical.

11. The compounds of the formula

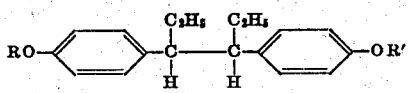

wherein R is a lower aliphatic acylated glucose radical and R' is a lower aroyl radical.

12. The mono-$\beta$-glucoside of 4:4'-dihydroxy-$\alpha$:$\beta$-diethyl-diphenylethane, melting at 203-204° C.

13. The mono-tetracetyl-$\beta$-glucoside of 4:4'-dihydroxy-$\alpha$:$\beta$-diethyl-diphenylethane.

14. The mono-tetracetyl-$\beta$-glucoside of 4-hydroxy-4'-benzoxy-$\alpha$:$\beta$-diethyl-diphenylethane, melting at 156° C.

KARL MIESCHER.
JULES HEER.
WERNER FISCHER.